May 2, 1967     KAZUMI MIZUKANE     3,317,364
PROCESS OF PRODUCING A KNOT MEMBER FOR A NECKTIE
Filed Aug. 16, 1963     3 Sheets-Sheet 1
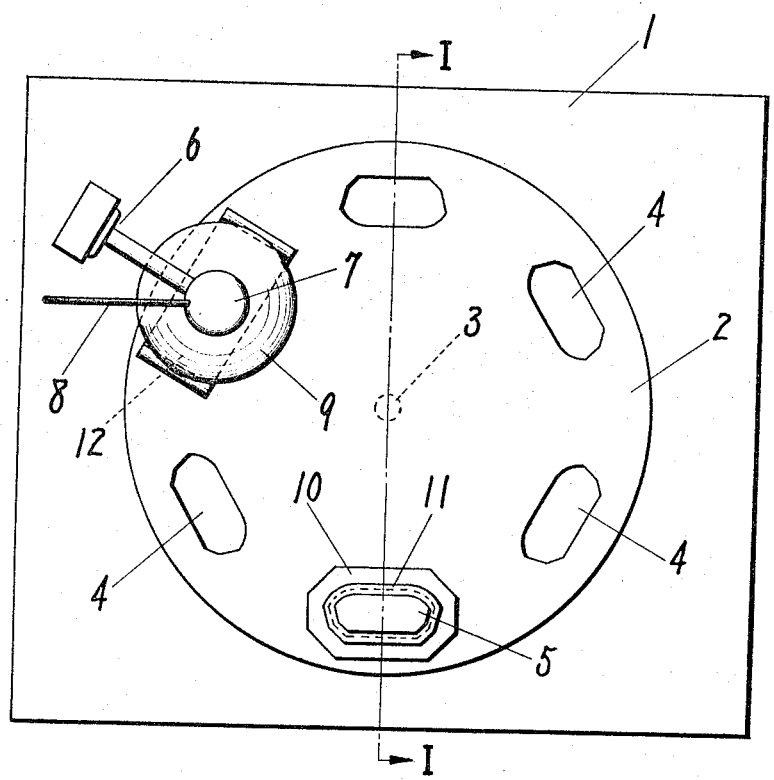
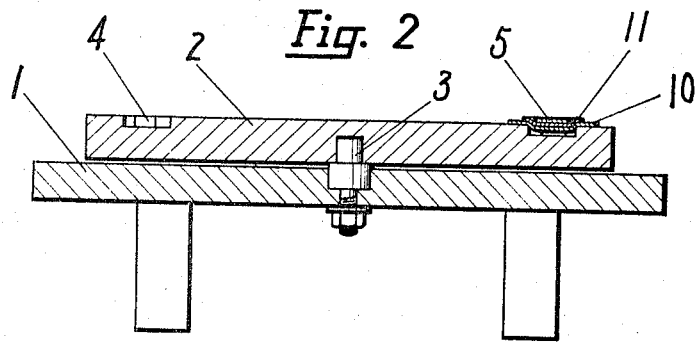
KAZUMI MIZUKANE
INVENTOR.
BY Wenderoth, Lind & Ponack
ATTORNEYS May 2, 1967   KAZUMI MIZUKANE   3,317,364
PROCESS OF PRODUCING A KNOT MEMBER FOR A NECKTIE
Filed Aug. 16, 1963   3 Sheets-Sheet 2

KAZUMI MIZUKANE
INVENTOR.

BY Wenderoth, Lind & Ponack
ATTORNEYS

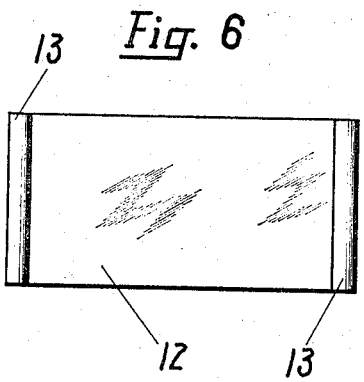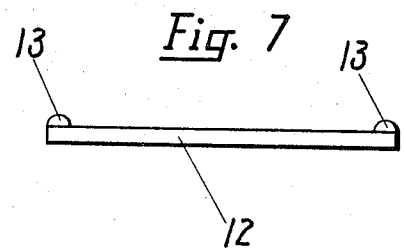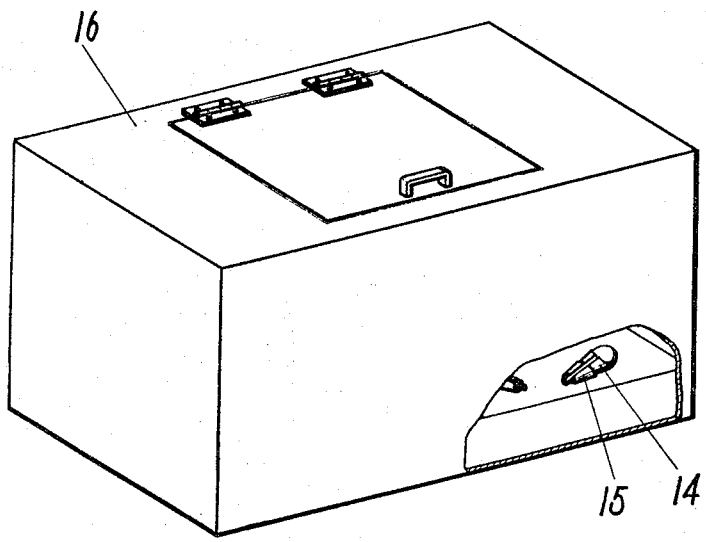

United States Patent Office 3,317,364
Patented May 2, 1967

3,317,364
PROCESS OF PRODUCING A KNOT MEMBER
FOR A NECKTIE
Kazumi Mizukane, 20 5-chome, Kogokitamachi,
Hiroshima-shi, Japan
Filed Aug. 16, 1963, Ser. No. 302,662
1 Claim. (Cl. 156—213)

The present invention relates to processes of producing a knot member for a necktie, by means of which the necktie can be readily worn without making a knot.

A process of producing a knot member for a necktie according to the invention consists of successively piling a piece of cloth, a sponge plate and a measure plate, said cloth piece being of hexagonal shape and suitably larger than said measure plate; said sponge plate being similarly shaped to and a little larger than said measure plate, and said measure plate being made of thermoplastic synthetic resin and of quasi-hexagonal shape, successively tucking and pasting the edge part of said cloth piece along the edge of said measure plate, producing unfinished knot member, putting a glass weight on said unfinished knot member located at one of dents on a rotary table, bringing said glass weight and said unfinished knot member below an infra-red ray lamp by turning said table, bending said unfinished knot member along the surface of a somewhat flat conical inner mold, pushing a somewhat flat conical outer mold on said inner mold, heating said assembled members in a heater, and taking the knot member out of said outer and inner molds.

The chief object of the invention is to surely attain a mass production of uniform and desirable knot members.

The features and advantages of the invention will become apparent from a consideration of the following description.

In the accompanying drawings:

FIG. 1 is a plan view of a work bench which is preferably used to carry out a process according to the invention;

FIG. 2 is a sectional side view of said bench taken along line I—I;

Figure 8:
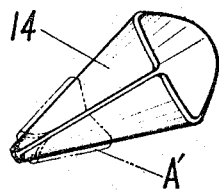
Figure 13:
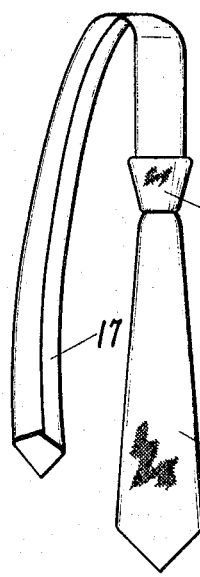
Figure 14:
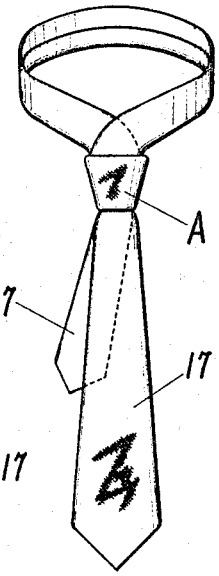
Figure 12:
Figure 10:
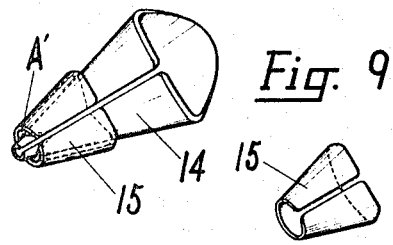
Figure 9:
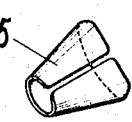
Figure 5:
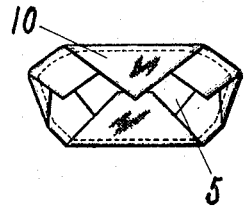
Figure 3:
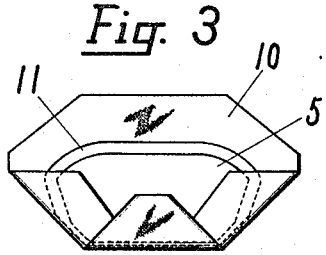
Figure 4:
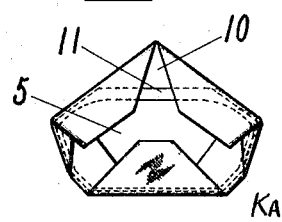

FIGS. 3, 4 and 5 respectively show a plan view of unfinished knot member at different states, illustrating an order of tucking in a piece of cloth;

FIGS. 6 and 7 are a plan view and a side view, respectively, of a glass weight which is used to press said unfinished knot member;

FIGS. 8 and 9 respectively show a perspective view of an inner mold and an outer mold, both being used to shape said unfinished knot member;

FIG. 10 is a perspective view of said inner and outer molds being used to shape said unfinished knot member;

FIG. 11 is a partly cut perspective view of a heater for heating said shaped unfinished knot members;

FIG. 12 is a perspective view of a knot member thus finished;

FIG. 13 is a perspective view of a necktie passing through said knot member; and FIG. 14 is a perspective view of said necktie in the usual tied style with said knot member.

Like characters of reference show corresponding parts throughout the views.

Referring to FIGS. 1 and 2, 1 denotes the aforesaid work bench which is preferably used to carry out a process according to the invention. On said bench a rotary round table 2 is mounted with its central pivot 3, and on the surface of said table and at the portion near its periphery a number of flat dents 4 are formed at equal intervals in a circle. The shape of each dent is similar to a thin measure plate 5, which is made of thermo-plastic synthetic resin and shaped to be quasi-hexagonal suitable for producing the aforesaid knot member A (FIG. 12), and a little larger than said plate.

Fixed on the work bench 1 is an infra-red ray lamp 6 having a socket 7, to which an electric cord 8 and a bulb 9 are attached, said bulb being positioned to be able to overlap one of the dents 4.

The aforesaid piece of cloth 10, which is of hexagonal shape and suitably larger than the measure plate 5, is put on one of the dents 4. On the central portion of said cloth piece a sponge plate 11 of foamed synthetic resin or the like, which is similarly shaped to and a little larger than the measure plate 5, and said measure plate are successively piled as shown in FIGS. 1 and 2 and pressed down.

Then the front edge part of the cloth piece 10 is tucked in along the front three edges of the measure plate 5 as shown in FIG. 3, this state being held by pasting, and next, both the side parts of said cloth piece are tucked in obliquely, and the back edge part thereof is tucked in along the back curved edge of said measure plate as shown in FIGS. 4 and 5, these states being also held by pasting, thus the aforesaid unfinished or half-made knot member A' is produced. However, said unfinished knot member may be produced without using the dents 4.

Now, put on the unfinished knot member A' is the aforesaid glass weight 12 which consists of a rectangular thick glass plate and is provided with a heavy metallic bar 13 at each end as shown in FIGS. 6 and 7, and then said weight together with the member A' are brought below the bulb 9 of the infra-red ray lamp 6 by turning the table 2, where said unfinished knot member is favorably heated, the measure plate 5 being softened and the used paste being solidified.

Next, after turning the table 2 and removing the glass weight 12, the unfinished knot member A' is bent along the surface of the aforesaid inner mold 14 which is made by bending a metallic plate to be long and somewhat flat conical as shown in FIG. 8, and on said inner mold the aforesaid outer mold 15, which is also made by bending a metallic plate to be short and somewhat flat conical as shown in FIG. 9, is pushed, pressing said bent unfinished knot member as shown in FIG. 10.

A large number of such assembled members are put in the aforesaid heater 16, which may be an electric heater, as shown in FIG. 11 and heated at 70°–100° C. for 10–20 minutes, thereby the special shape of each unfinished knot member being settled. After natural cooling the finished knot member A is obtained by taking it out of the outer mold 15 and the inner mold 14, said knot member being of somewhat flat conical shape.

As shown in FIG. 13, passed through the knot member A is the aforesaid necktie 17 which may be made of the same or different cloth with or from said knot member and more or less shorter than ordinary neckties, and they are rigidly connected together by stitching or other means at a suitable position of said necktie, and then the slender part of said necktie is wound around a collar and again passed through said knot member as shown in FIG. 14, thus said necktie being worn in good appearance in the usual tied style.

The knot member A provides a plump surface and gives a soft feeling on account of the sponge plate 11, but is not deformable due to the measure plate 5 of thermo-plastic synthetic resin, and a mass production of such desirable and uniform knot members can be surely attained.

Without further description it is thought that the features and advantages of the invention will be readily apparent to those skilled in the art, and it will of course be understood that changes in the form, proportion and minor details of process may be resorted to, without departing from the spirit of the invention or the scope of the appended claim.

What I claim is:

A process of producing a knot member for a necktie, which consists of successively piling a piece of cloth, a sponge plate and a measure plate, said cloth piece being of hexagonal shape and suitably larger than said measure plate; said sponge plate being similarly shaped to and a little larger than said measure plate, and said measure plate being made of thermo-plastic synthetic resin and of quasi-hexagonal shape, successively tucking in and pasting the edge part of said cloth piece along the edge of said measure plate, thereby producing unfinished knot member, putting a glass weight on said unfinished knot member located at one of dents on a rotary table, bringing said glass weight and said unfinished knot member below an infra-red ray lamp by turning said table, bending said unfinished knot member along the surface of a somewhat flat conical inner mold, pushing a somewhat flat conical outer mold onto said inner mold over said unfinished knot member, heating said assembled members in a heater, and taking the knot member out of said outer and inner molds.

References Cited by the Examiner

UNITED STATES PATENTS 2,624,089  1/1953  Eaton _____ 156—213

ALEXANDER WYMAN, *Primary Examiner.*

MORRIS SUSSMAN, *Examiner.*

W. J. VAN BALEN, *Assistant Examiner.*